(12) United States Patent
Yan et al.

(10) Patent No.: US 11,826,727 B2
(45) Date of Patent: Nov. 28, 2023

(54) MODIFIED CALCIUM SILICATE BASED NICKEL CATALYST AND PREPARATION METHOD AND APPLICATION THEREOF

(71) Applicant: DeCarbon Technology (Shenzhen) Co., Ltd., Guangdong (CN)

(72) Inventors: Feng Yan, Guangdong (CN); Fan Qu, Guangdong (CN); Zuotai Zhang, Guangdong (CN); Chunyan Li, Guangdong (CN); Heijin Chen, Guangdong (CN); Xuehua Shen, Guangdong (CN)

(73) Assignee: DECARBON TECHNOLOGY (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/136,226

(22) Filed: Apr. 18, 2023

(65) Prior Publication Data
US 2023/0271165 A1 Aug. 31, 2023

Related U.S. Application Data

(63) Continuation of application No. PCT/CN2022/081740, filed on Mar. 18, 2022.

(30) Foreign Application Priority Data

Feb. 25, 2022 (CN) .......................... 202210176693.4

(51) Int. Cl.
*B01J 23/10* (2006.01)
*B01J 23/02* (2006.01)
(Continued)

(52) U.S. Cl.
CPC ............... *B01J 23/10* (2013.01); *B01J 23/02* (2013.01); *B01J 23/755* (2013.01); *B01J 37/009* (2013.01);
(Continued)

(58) Field of Classification Search
None
See application file for complete search history.

(56) References Cited

U.S. PATENT DOCUMENTS

2018/0141032 A1* 5/2018 Friedel ................... B01J 35/023

FOREIGN PATENT DOCUMENTS

| CN | 108584969 A | 9/2018 |
|---|---|---|
| CN | 112547067 A | 3/2021 |

(Continued)

OTHER PUBLICATIONS

Chinese Office Action dated Jun. 22, 2022 issued in CN 202210176693.4.

*Primary Examiner* — Colin W. Slifka
(74) *Attorney, Agent, or Firm* — Scully, Scott, Murphy & Presser, P.C.

(57) ABSTRACT

A calcium silicate based nickel catalyst and a preparation method and application thereof are provided. The method includes: leaching a silicon based solid waste with an alkali agent to obtain a silicate leaching solution; adding the silicate leaching solution and a nitrate solution corresponding to a lanthanum metal dropwise to a calcium hydroxide suspension for a first precipitation reaction, and subjecting a precipitate produced by the reaction to filtration, drying and calcination to obtain a modified calcium silicate support; and dispersing the modified calcium silicate support in an anhydrous alcohol solvent to obtain a mixed suspension, adding an alcohol solution of a nickel salt dropwise to the mixed suspension for a second precipitation reaction, conducting heating and stirring until alcohols in the anhydrous alcohol solvent and the alcohol solution of a nickel salt are volatilized, and conducting drying and calcination to obtain the modified calcium silicate based nickel catalyst.

20 Claims, 4 Drawing Sheets

(51) Int. Cl.
*B01J 37/06* (2006.01)
*B01J 37/03* (2006.01)
*B01J 37/00* (2006.01)
*B01J 37/02* (2006.01)
*B01J 37/08* (2006.01)
*B01J 37/34* (2006.01)
*B01J 37/18* (2006.01)
*C01B 3/40* (2006.01)
*B01J 23/755* (2006.01)

(52) U.S. Cl.
CPC ....... *B01J 37/0219* (2013.01); *B01J 37/0221* (2013.01); *B01J 37/0236* (2013.01); *B01J 37/035* (2013.01); *B01J 37/06* (2013.01); *B01J 37/088* (2013.01); *B01J 37/18* (2013.01); *B01J 37/343* (2013.01); *C01B 3/40* (2013.01); *C01B 2203/0238* (2013.01); *C01B 2203/1058* (2013.01); *C01B 2203/1082* (2013.01); *C01B 2203/1241* (2013.01)

(56) References Cited

FOREIGN PATENT DOCUMENTS

| | | |
|---|---|---|
| CN | 113171757 A | 7/2021 |
| WO | 2013186474 A1 | 12/2013 |

* cited by examiner

```
Leaching: leaching a silicon based solid waste with an alkali agent to obtain a silicate
                                leaching solution
```

```
  Preparation of a support: adding the silicate leaching solution and a nitrate solution
corresponding to a lanthanum metal dropwise to a calcium hydroxide suspension for a
  first precipitation reaction, and subjecting a precipitate produced by the reaction to
     filtration, drying and calcination to obtain a modified calcium silicate support
```

```
   Loading: dispersing the modified calcium silicate support in an anhydrous alcohol
     solvent to obtain a mixed suspension, adding an alcohol solution of a nickel salt
        dropwise to the mixed suspension for a second precipitation reaction, conducting
      heating and stirring until alcohols in the anhydrous alcohol solvent and the alcohol
   solution of a nickel salt are volatilized, and then conducting drying and calcination to
              obtain the modified calcium silicate based nickel catalyst
```

FIG. 1

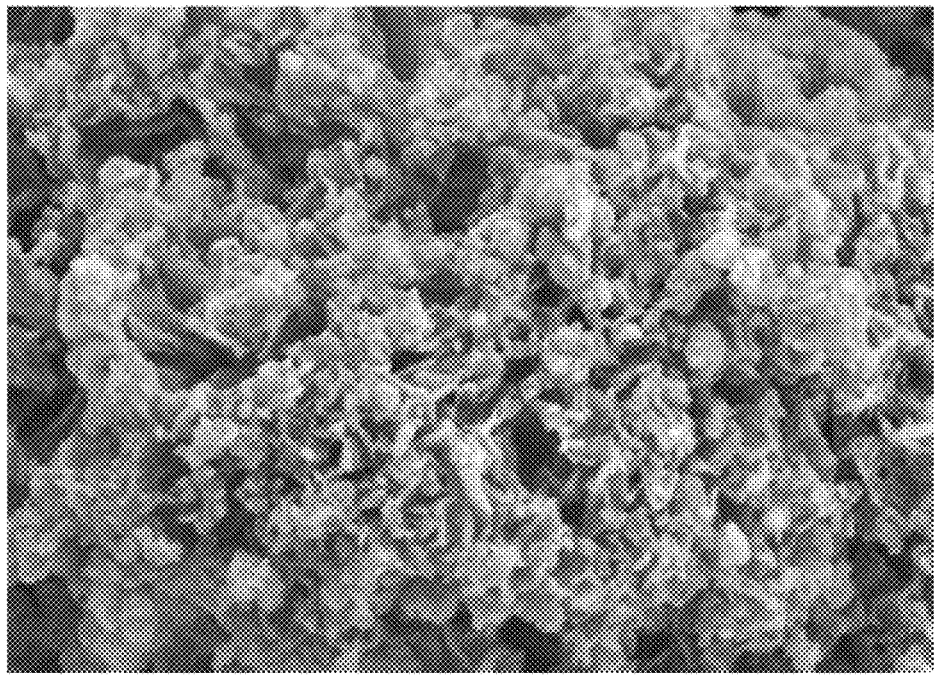

FIG. 2

MODIFIED CALCIUM SILICATE BASED NICKEL CATALYST AND PREPARATION METHOD AND APPLICATION THEREOF

CROSS-REFERENCE TO RELATED APPLICATIONS

The application is a continuation of International Application No. PCT/CN2022/081740, filed on Mar. 18, 2022, which claims priority to Chinese Patent Application No. 202210176693.4, filed on Feb. 25, 2022, the entire disclosures of each of which are incorporated herein by reference for all purposes. No new matter has been introduced.

FIELD

The present application relates to the field of biogas, resource utilization of industrial solid wastes and preparation of catalysts, and in particular to a modified calcium silicate based nickel catalyst and a preparation method and application thereof.

BACKGROUND

A biogas reforming technology is a biogas resource utilization technology with a broad prospect. A biogas reforming reaction can be used for simultaneously utilizing methane and carbon dioxide in biogas and converting the two gases into syngas with a higher application value.

A catalyst plays an important role in the biogas reforming reaction. However, current catalysts used in the biogas reforming reaction have the problems of high cost and easy inactivation, so that industrial application of the biogas reforming reaction is limited.

SUMMARY

The present application provides a modified calcium silicate based nickel catalyst and a preparation method and application thereof, so as to solve the problems of high cost and easy inactivation of current catalysts used in a biogas reforming reaction.

In a first aspect, the present application provides a preparation method of a modified calcium silicate based nickel catalyst. The preparation method includes the following steps:

leaching: leaching a silicon based solid waste with an alkali agent to obtain a silicate leaching solution;

preparation of a support: adding the silicate leaching solution and a nitrate solution corresponding to a lanthanum metal dropwise to a calcium hydroxide suspension for a first precipitation reaction, and subjecting a precipitate produced by the reaction to filtration, drying and calcination to obtain a modified calcium silicate support; and loading: dispersing the modified calcium silicate support in an anhydrous alcohol solvent to obtain a mixed suspension, adding an alcohol solution of a nickel salt dropwise to the mixed suspension for a second precipitation reaction, conducting heating and stirring until alcohols in the anhydrous alcohol solvent and the alcohol solution of a nickel salt are volatilized, and then conducting drying and calcination to obtain the modified calcium silicate based nickel catalyst.

Further, the silicon based solid waste includes at least one of rice husk ash, fly ash, metallurgical slag or blast furnace iron slag; the alkali agent includes at least one of sodium hydroxide, potassium hydroxide, sodium carbonate or potassium carbonate;

and in the step of loading, the anhydrous alcohol solvent is anhydrous ethanol, anhydrous methanol or anhydrous propanol, and alcohol used in the alcohol solution of a nickel salt is the same that in the anhydrous alcohol solvent.

Further, the nitrate solution corresponding to a lanthanum metal includes at least one of cerium nitrate, lanthanum nitrate, samarium nitrate or praseodymium nitrate;

in the step of preparation of a support, the molar ratio of a silicate ion in the silicate leaching solution to calcium hydroxide in the calcium hydroxide suspension is 0.9:1 to 1.1:1; and the doping amount of the lanthanum metal in the modified calcium silicate support is 1-10 wt %.

Further, in the step of preparation of a support, the silicate leaching solution is added dropwise at a rate of 20-30 mL/h, the nitrate solution corresponding to a lanthanum metal is added dropwise at a rate of 10-15 mL/h, and the first precipitation reaction is carried out at a temperature of 25-60° C. and a stirring rate of 450-550 rpm for 2-8 h.

Further, in the step of preparation of a support, the precipitate produced by the reaction is sequentially washed with water for at least one time and washed with an alcohol solvent for at least one time after filtration and before drying, the drying is conducted at 75-85° C. for 10-14 h, and the calcination is conducted at 500-800° C. for 1.8-2.5 h.

Further, in the step of loading, the modified calcium silicate support is added to anhydrous ethanol for ultrasonic dispersion for 10-15 min to obtain the mixed suspension, where the solid-liquid ratio of the modified calcium silicate support to the anhydrous ethanol is 1 g:30 mL to 1 g:60 mL, and the loading amount of nickel in the modified calcium silicate based nickel catalyst is 0.5-10 wt %.

Further, in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

Further, in the step of loading, the drying is conducted at 75-85° C. for 1.5-3 h, and the calcination is conducted at 400-500° C. for 4-5 h.

In a second aspect, an embodiment of the present application provides a modified calcium silicate based nickel catalyst. The modified calcium silicate based nickel catalyst is prepared by the preparation method as described in the first aspect.

In a third aspect, an embodiment of the present application provides application of a modified calcium silicate based nickel catalyst. The modified calcium silicate based nickel catalyst is prepared by the preparation method as described in the first aspect, and used for a biogas reforming reaction.

Further, the biogas reforming reaction includes the following steps:

introducing a reducing gas into the modified calcium silicate based nickel catalyst to reduce the modified calcium silicate based nickel catalyst at 650-900° C., where the reducing gas contains 10-20 vol % of hydrogen; and introducing a feed gas into the reduced modified calcium silicate based nickel catalyst for a reaction at a volume space velocity of 10,000-60,000 mL/g/h at 650-900° C., where the feed gas consists of 20-40 vol % of $CH_4$, 20-40 vol % of $CO_2$ and 20-60 vol % of an inert gas, and the inert gas is at least one of nitrogen, helium, neon or argon.

Further, in the biogas reforming reaction, when the reaction temperature is equal to or greater than 750° C., the conversion rate of methane is equal to or greater than 80%, the conversion rate of carbon dioxide is equal to or greater than 87%, and the $H_2/CO$ selectivity coefficient is equal to or greater than 0.8.

Compared with the prior art, the present application has the following beneficial effects.

The modified calcium silicate based nickel catalyst obtained by the preparation method in an embodiment of the present application has the advantages of low cost, high stability and high activity, and has an industrial application prospect.

First, according to a catalyst in an embodiment of the present application, commonly used materials such as a carbon based material, nano silica or nano alumina are not used as a support, and modified calcium silicate is used as the support instead. The active metal nickel is loaded by means of a precipitation reaction of the calcium silicate with alkaline properties and a nickel salt. Under the condition that no precipitant such as ammonia is added, nickel is uniformly precipitated to the surface of the calcium silicate support through the above precipitation reaction, so as to achieve the purposes of high dispersion degree of the active metal nickel on the calcium silicate support and strong interaction force between the metal and the support. The active metal nickel has high dispersion degree, so that when the loading amount of nickel in the catalyst is low, not only can a good catalytic effect be achieved to meet requirements of catalytic properties, but also the use amount of nickel and the production cost of the nickel catalyst are reduced.

Second, on the basis of using calcium silicate as a support in an embodiment of the present application, the calcium silicate is also further modified. Through a co-precipitation reaction, the lanthanide metal is doped into the calcium silicate in a more uniform and dispersive way. Thus, through the interaction of the lanthanum metal modified calcium silicate support and the active metal nickel, the phenomena of sintering and carbon deposition under high temperature conditions can be effectively inhibited, and the catalytic activity and stability of the modified calcium silicate based nickel catalyst are further improved.

At last, the modified calcium silicate based nickel catalyst prepared in an embodiment of the present application has a good industrial application prospect. When the silicate leaching solution extracted from the silicon based solid waste is used as a raw material, not only are the advantages of wide sources of raw materials and low cost achieved, but also resource utilization of solid wastes is achieved, and higher environmental friendliness is achieved.

BRIEF DESCRIPTION OF THE DRAWINGS

In order to more clearly illustrate technical solutions in embodiments of the present application, drawings required for use in the embodiments are briefly introduced below. Obviously, the drawings described below are merely some embodiments of the present application, and other drawings can be obtained by persons of ordinary skill in the field according to these drawings without any creative effort.

FIG. 1 is a flow diagram showing a preparation method of a modified calcium silicate based nickel catalyst in an embodiment of the present application;

FIG. 2 is a scanning electron microscopy image of a modified calcium silicate based nickel catalyst in Example 1;

DESCRIPTION OF EMBODIMENTS

Figure 3:
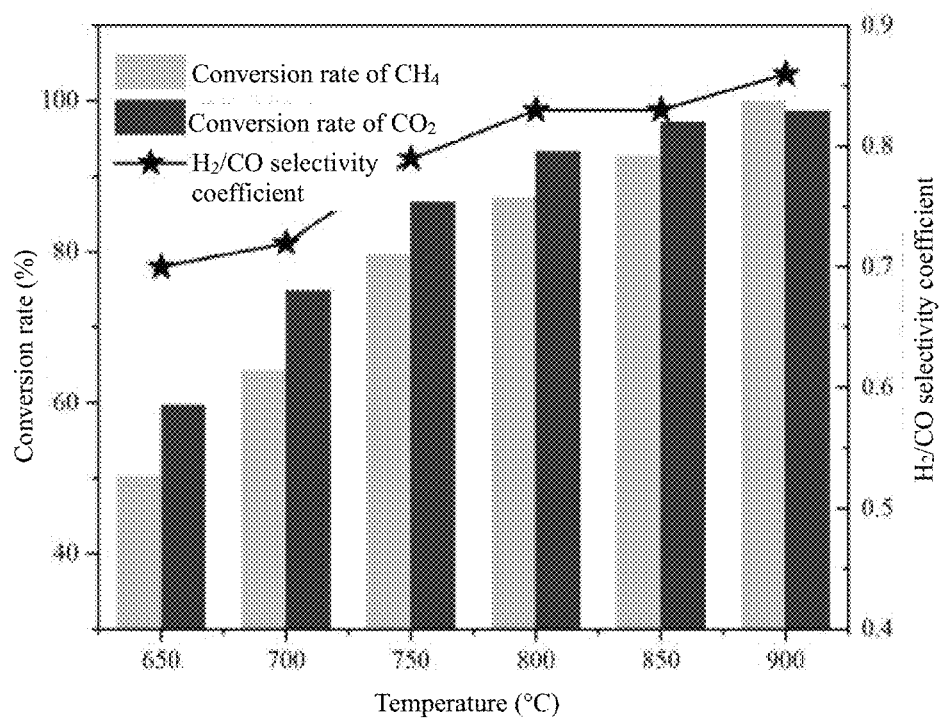
FIG. 3 is a diagram showing the catalytic conversion rate of the modified calcium silicate based nickel catalyst in Example 1 at different temperatures.

The technical solutions in the embodiments of the present application are clearly and completely described below in conjunction with the drawings attached to the embodiments of the present application. Obviously, the embodiments described are merely a part, rather than all of the embodiments of the present application. On the basis of the embodiments in the present application, all other embodiments obtained by persons of ordinary skill in the field without any creative effort shall fall within the protection scope of the present application.

In the present application, orientation or position relations indicated by the terms such as "up", "down", "left", "right", "front", "rear", "top", "bottom", "inside", "outside", "middle", "vertical", "horizontal", "transverse" and "longitudinal" are orientation or position relations as shown in the attached drawings. These terms are intended mainly to better describe the present application and the embodiments thereof, and are not intended to limit that devices, elements or components indicated must have a specific orientation or be constructed and operated in a specific orientation.

In addition, some of the terms mentioned above may also be used for expressing other meanings besides the orientation or position relations. For example, the term "up" may also be used for expressing an attachment relation or a connection relation in some cases. Specific meanings of these terms in the present application may be understood by persons of ordinary skill in the field according to specific cases.

Moreover, the terms "install", "set", "provide", "connection" and "connected" should be understood broadly. For example, fixed connection, detachable connection, or monolithic construction may be indicated; mechanical connection or electrical connection may be indicated; and directly connected may be indicated, indirectly connected through an intermediate medium may be indicated, or internal communication between two devices, elements or components may be indicated. Specific meanings of the terms above in the present application may be understood by persons of ordinary skill in the field according to specific cases.

In addition, the terms "first", "second" and the like are intended mainly to distinguish different devices, elements or components (the specific type and construction may be the same or different), and are not intended to indicate or imply the relative importance or quantity of indicated devices, elements or components. Unless otherwise specified, the term "a plurality of" indicates two or more.

The technical solutions of the present application are further explained below in conjunction with specific embodiments and attached drawings.

More than 90% of components in biogas are methane and carbon dioxide. The greenhouse effect will be aggravated by direct emission of the two greenhouse gases. In addition, the methane is a flammable gas, safety risks will be caused by direct emission, and the methane has extremely high calorific value. Therefore, resource utilization of the biogas is of great significance. In related technologies, biogas resource utilization technologies mainly include two directions: one is a technology for power generation, gasification and the like based on the calorific value of the methane in the biogas, and the other one is a biogas reforming technology for producing hydrogen or syngas with higher value with the biogas as a chemical raw material. The technology for power generation and the like based on the calorific value of the methane in the biogas still has the problem of capturing carbon dioxide in the biogas, while the biogas reforming technology can simultaneously use the methane and carbon dioxide in the biogas for a reaction, so that not only is the step of removing carbon dioxide eliminated, but also the two greenhouse gases including methane and carbon dioxide can be consumed at the same time. Therefore, the biogas reforming technology is a biogas resource utilization technology with higher value.

A biogas reforming reaction requires the participation of a catalyst, but the application of catalysts in the biogas reforming reaction in related technologies is limited. The biogas reforming reaction is a highly endothermic reaction. Thus, in order to maintain high conversion rates of the methane and carbon dioxide in the biogas, a high energy input is required, and that is to say, a high reaction temperature is required. However, due to a high reaction temperature, sintering and carbon deposition of an active metal in a catalyst will be caused at high temperature, resulting in rapid inactivation of the catalyst. In addition, the catalyst also has the problem of high cost, so that industrial application of the catalyst is limited.

Based on the above analysis, an embodiment of the present application provides a modified calcium silicate based nickel catalyst and a preparation method and application thereof, in order to solve the problems of high cost and easy inactivation of existing catalysts used in a biogas reforming reaction.

In a first aspect, an embodiment of the present application provides a preparation method of a modified calcium silicate based nickel catalyst. FIG. 1 is a flow diagram showing a preparation method of a modified calcium silicate based nickel catalyst in an embodiment of the present application. The preparation method includes the following steps:
  leaching: leaching a silicon based solid waste with an alkali agent to obtain a silicate leaching solution;
  preparation of a support: adding the silicate leaching solution and a nitrate solution corresponding to a lanthanum metal dropwise to a calcium hydroxide suspension for a first precipitation reaction, and subjecting a precipitate produced by the reaction to filtration, drying and calcination to obtain a modified calcium silicate support; and
  loading: dispersing the modified calcium silicate support in an anhydrous alcohol solvent to obtain a mixed suspension, adding an alcohol solution of a nickel salt dropwise to the mixed suspension for a second precipitation reaction, conducting heating and stirring until alcohols in the anhydrous alcohol solvent and the alcohol solution of a nickel salt are volatilized, and then conducting drying and calcination to obtain the modified calcium silicate based nickel catalyst.

The modified calcium silicate based nickel catalyst obtained by the preparation method in an embodiment of the present application has the advantages of low cost, high stability and high activity, and has an industrial application prospect.

First, according to a catalyst in an embodiment of the present application, commonly used materials such as a carbon based material, nano silica or nano alumina are not used as a support, and modified calcium silicate is used as the support instead. The active metal nickel is loaded by means of a precipitation reaction of the calcium silicate with alkaline properties and a nickel salt. Under the condition that no precipitant such as ammonia is added, nickel is uniformly precipitated to the surface of the calcium silicate support through the above precipitation reaction, so as to achieve the purposes of high dispersion degree of the active metal nickel on the calcium silicate support and strong interaction force between the metal and the support. The active metal nickel has high dispersion degree, so that when the loading amount of nickel in the catalyst is low, not only can a good catalytic effect be achieved to meet requirements of catalytic properties, but also the use amount of nickel and the production cost of the nickel catalyst are reduced.

Second, on the basis of using calcium silicate as a support in an embodiment of the present application, the calcium silicate is also further modified. Through a co-precipitation reaction, the lanthanide metal is doped into the calcium silicate in a more uniform and dispersive way. Thus, through the interaction of the lanthanum metal modified calcium silicate support and the active metal nickel, the phenomena of sintering and carbon deposition under high temperature conditions can be effectively inhibited, and the catalytic activity and stability of the modified calcium silicate based nickel catalyst are further improved.

At last, the modified calcium silicate based nickel catalyst prepared in an embodiment of the present application has a good industrial application prospect. When the silicate leaching solution extracted from the silicon based solid waste is used as a raw material, not only are the advantages of wide sources of raw materials and low cost achieved, but also resource utilization of solid wastes is achieved, and higher environmental friendliness is achieved.

It should be noted that supports commonly used for loading nickel in the field usually include a carbon based support, a silica support and other supports, and means commonly used for loading nickel on the supports usually include an equivalent-volumetic impregnation method. The supports which are mostly materials with larger pore size are mainly used, and a nickel salt solution containing an active metal component can penetrate into pore channels of the supports through capillary pressure, so as to achieve the purpose of impregnating nickel into the supports. However, calcium silicate is not a commonly used support in the field. Thus, the use of the calcium silicate as a support for loading nickel proposed in the present application is one of important invention points in the present application. After a lot of experiments in the present application, it has been found that when a calcium silicate support is dispersed in an anhydrous alcohol solvent, the pH is alkaline equal to or greater than 12. Due to such property, a precipitation reaction occurs when a nickel salt is added dropwise to a mixed suspension formed by the calcium silicate support and the anhydrous alcohol solvent, and that is to say, a nickel ion can be precipitated into nickel hydroxide without the use of a precipitant (such as ammonia water), so that nickel is loaded on the surface of the calcium silicate in a more uniform and dispersive way through the precipitation reaction. Further, due to the combination way of the active metal nickel and the calcium silicate support, the interaction between the two substances is firmer, and the nickel catalyst prepared has higher stability. Furthermore, as nickel is more uniformly and dispersively distributed on the calcium silicate support, a good catalytic effect can be achieved when a small amount of nickel is used in the present application.

Optionally, the silicon based solid waste includes at least one of rice husk ash, fly ash, metallurgical slag or blast furnace iron slag. The silicon based solid waste has wide sources and low cost. When a silicate leaching solution extracted after dissolution of the silicon based solid waste with an alkali is used as a raw material for preparing the calcium silicate support, not only is low cost achieved, but also resource recycling of the silicon based solid waste is achieved. Preferably, the silicon based solid waste in an embodiment of the present application is fly ash. A silicate leaching solution can be obtained by only leaching the fly ash with an alkali agent and then conducting filtration, and complex operation steps with high energy consumption such as high temperature calcination of the fly ash are not required.

Optionally, the alkali agent includes at least one of sodium hydroxide or potassium hydroxide. In an embodiment of the present application, the silicon based solid waste is leached with an alkali agent. Specifically, the alkali agent and the silicon based solid waste undergo a hydrothermal reaction to obtain a silicate leaching solution. Preferably, the alkali agent is a sodium hydroxide aqueous solution, the fly ash is leached with the sodium hydroxide aqueous solution, the two substances are mixed and heated for a hydrothermal reaction in a hydrothermal synthesis reactor at 110° C. for 0.5 h, and then filtration and separation are conducted to obtain a sodium silicate leaching solution.

Further, in the step of loading, the anhydrous alcohol solvent is anhydrous ethanol, anhydrous methanol or anhydrous propanol, and alcohol used in the alcohol solution of a nickel salt is the same that in the anhydrous alcohol solvent. Preferably, the anhydrous alcohol solvent for dispersing the modified calcium silicate support is anhydrous ethanol, and alcohol in the alcohol solution for dissolving a nickel salt is ethanol. In this case, the modified calcium silicate support and the nickel salt undergo a second precipitation reaction in the same alcohol system, so that convenience is provided for complete volatilization of an alcohol under same temperature conditions, the operation is more convenient, and uniform dispersion of nickel on the modified calcium silicate support is more facilitated.

Further, the nitrate solution corresponding to a lanthanum metal includes at least one of cerium nitrate, lanthanum nitrate, samarium nitrate or praseodymium nitrate; in the step of preparation of a support, the molar ratio of a silicate ion in the silicate leaching solution to calcium hydroxide in the calcium hydroxide suspension is 0.9:1 to 1.1:1; and the doping amount of the lanthanum metal in the modified calcium silicate support is 1-10 wt %. Through the first precipitation reaction, a lanthanum metal ion is doped into the calcium silicate for modifying the calcium silicate, which can play a better effect of preventing carbon deposition.

The molar ratio of a silicate ion in the silicate leaching solution to calcium hydroxide in the calcium hydroxide suspension is 0.9:1 to 1.1:1, including any point value in the molar ratio range. For example, the molar ratio of a silicate ion in the silicate leaching solution to calcium hydroxide in the calcium hydroxide suspension is 0.9:1, 1:1, or 1.1:1. The doping amount of the lanthanum metal in the modified calcium silicate support is 1-10 wt %, including any point value in the doping amount value range. For example, the doping amount of the lanthanum metal in the modified calcium silicate support is 1 wt %, 2 wt %, 5 wt %, 8 wt %, or 10 wt %.

Further, in the step of preparation of a support, the silicate leaching solution is added dropwise at a rate of 20-30 mL/h, the nitrate solution corresponding to a lanthanum metal is added dropwise at a rate of 10-15 mL/h, and the first precipitation reaction is carried out at a temperature of 25-60° C. and a stirring rate of 450-550 rpm for 2-8 h.

In the present application, a support is prepared by a co-precipitation reaction of sodium silicate and calcium hydroxide, and a lanthanum metal is doped in the process for making the produced calcium silicate support doped with the lanthanum metal so as to improve the carbon deposition resistance of the catalyst at high temperature. In the step of preparation of a support, when the dropping rates of the silicate leaching solution and the nitrate solution corresponding to a lanthanum metal and conditions of the first precipitation reaction are controlled within the range of conditions, convenience is provided for producing calcium silicate with more suitable particle size and more regular particles, so that the calcium silicate with a porous structure is more suitable for being used as a support of a catalyst.

The dropping rate of the silicate leaching solution is 20-30 mL/h, including any point value in the value range. For example, the dropping rate of the silicate leaching solution is 20 mL/h, 22 mL/h, 25 mL/h, 28 mL/h, or 30 mL/h. The dropping rate of the nitrate solution corresponding to a lanthanum metal is 10-15 mL/h, including any point value in the value range. For example, the dropping rate of the nitrate solution corresponding to a lanthanum metal is 10 mL/h, 12 mL/h, 13 mL/h, or 15 mL/h. The reaction temperature of the first precipitation reaction is 25-60° C., including any point value in the temperature range. For example, the reaction temperature of the first precipitation reaction is 25° C., 35° C., 45° C., or 60° C. The stirring rate of the first precipitation reaction is 450-550 rpm, including any point value in the stirring rate range. For example, the stirring rate of the first precipitation reaction is 450 rpm, 500 rpm, or 550 rpm. The reaction time of the first precipitation reaction is 2-8 h, including any point value in the reaction time range. For example, the reaction time of the first precipitation reaction is 2 h, 4 h, 6 h, or 8 h.

Further, in the step of preparation of a support, the precipitate produced by the reaction is sequentially washed with water for at least one time and washed with an alcohol solvent for at least one time after filtration and before drying, the drying is conducted at 75-85° C. for 10-14 h, and the calcination is conducted at 500-800° C. for 1.8-2.5 h.

In the step of preparation of a support, the drying is conducted at a temperature of 75-85° C., including any point value in the temperature range. For example, the drying is conducted at a temperature of 75° C., 78° C., 80° C., 82° C., or 85° C. The drying is conducted for 10-14 h, including any point value in the time range. For example, the drying is conducted for 10 h, 12 h, or 14 h. The calcination is conducted at a temperature of 500-800° C., including any point value in the temperature range. For example, the calcination is conducted at a temperature of 500° C., 600° C., 700° C., or 800° C. The calcination is conducted for 1.8-2.5 h, including any point value in the time range. For example, the calcination is conducted for 1.8 h, 2 h, 2.2 h, or 2.5 h.

Further, in the step of loading, the anhydrous alcohol solvent is anhydrous ethanol, and the modified calcium silicate support is added to the anhydrous ethanol for ultrasonic dispersion for 10-15 min to obtain the mixed suspension, where the solid-liquid ratio of the modified calcium silicate support to the anhydrous ethanol is 0.8 g:50 mL to 1.2 g:50 mL, and the loading amount of nickel in the modified calcium silicate based nickel catalyst is 0.5-10 wt %.

The ultrasonic dispersion is conducted for 10-15 min, including any point value in the ultrasonic time range. For example, the ultrasonic dispersion is conducted for 10 min, 12 min, or 15 min. The solid-liquid ratio of the modified calcium silicate support to the anhydrous ethanol is 0.8 g:50 mL to 1.2 g:50 mL, including any point value in the solid-liquid ratio range. For example, the solid-liquid ratio of the modified calcium silicate support to the anhydrous ethanol is 0.8 g:50 mL, 1 g:50 mL, or 1.2 g:50 mL. The loading amount of nickel in the modified calcium silicate based nickel catalyst is 0.5-10 wt %, including any point value in the loading amount range. For example, the loading amount of nickel in the modified calcium silicate based nickel catalyst is 0.5 wt %, 1 wt %, 2 wt %, 5 wt %, 8 wt %, or 10 wt %.

Further, in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

The dropping rate of the ethanol solution of a nickel salt is 50-100 mL/h, including any point value in the value range. For example, the dropping rate of the ethanol solution of a nickel salt is 50 mL/h, 60 mL/h, 70 mL/h, 80 mL/h, 90 mL/h, or 100 mL/h. The reaction temperature of the second precipitation reaction is 65-68° C., including any point value in the temperature rang. For example, the reaction temperature of the second precipitation reaction is 65° C., 66° C., 67° C., or 68° C. The stirring rate of the second precipitation reaction is 450-550 rpm, including any point value in the stirring rate range. For example, the stirring rate of the second precipitation reaction is 450 rpm, 500 rpm, or 550 rpm.

When nickel is loaded on the modified calcium silicate support in the present application, the modified calcium silicate support is dispersed in an anhydrous alcohol solvent to achieve alkaline properties, so that a nickel ion is loaded to the modified calcium silicate support through a second precipitation reaction. Therefore, in the step of loading in the present application, when the dropping rate of the alcohol solution of a nickel salt and conditions of the second precipitation reaction are controlled within the ranges of the above conditions, convenience is provided for loading nickel on the surface of the modified calcium silicate support in a more uniform and dispersive way.

Further, in the step of loading, the drying is conducted at 75-85° C. for 1.5-3 h, and the calcination is conducted at 400-500° C. for 4-5 h.

In the step of loading, the drying is conducted at a temperature of 75-85° C., including any point value in the temperature range. For example, the drying is conducted at a temperature of 75° C., 78° C., 80° C., 82° C., or 85° C. The drying is conducted for 1.5-3 h, including any point value in the time range. For example, the drying is conducted for 1.5 h, 2 h, or 3 h. The calcination is conducted at a temperature of 400-500° C., including any point value in the temperature range. For example, the calcination is conducted at a temperature of 400° C., 450° C., or 500° C. The calcination is conducted for 4-5 h, including any point value in the time range. For example, the calcination is conducted for 4 h, 4.5 h, or 5 h.

In a second aspect, an embodiment of the present application further provides a modified calcium silicate based nickel catalyst. The modified calcium silicate based nickel catalyst is prepared by the preparation method as described in the first aspect.

The modified calcium silicate based nickel catalyst prepared in an embodiment of the present application has the advantages of low cost, high catalytic activity and high stability. In an embodiment of the present application, it has been proposed for the first time that calcium silicate is used as a support of a nickel catalyst, and based on alkaline properties of the calcium silicate, nickel is more uniformly and dispersively loaded on the surface of the calcium silicate support in a precipitation way without additional addition of a precipitant. At the same time, as the calcium silicate support is further modified with a lanthanum metal, that is to say, the modified calcium silicate support is a calcium silicate support doped with the lanthanum metal, the carbon deposition resistance of the nickel catalyst can be further improved through the synergistic effect of the lanthanum metal modified calcium silicate support and the active metal nickel.

In a third aspect, an embodiment of the present application provides application of a modified calcium silicate based nickel catalyst. The modified calcium silicate based nickel catalyst is prepared by the preparation method as described in the first aspect, and used for a biogas reforming reaction.

Further, the biogas reforming reaction includes the following steps:
  introducing a reducing gas into the modified calcium silicate based nickel catalyst to reduce the modified calcium silicate based nickel catalyst at 650-900° C., where the reducing gas contains 10-20 vol % of hydrogen; and
  introducing a feed gas into the reduced modified calcium silicate based nickel catalyst for a reaction at a volume space velocity of 10,000-60,000 mL/g/h at 650-900° C., where the feed gas consists of 20-40 vol % of $CH_4$, 20-40 vol % of $CO_2$ and 20-60 vol % of an inert gas, and the inert gas is at least one of nitrogen, helium, neon or argon.

The modified calcium silicate based nickel catalyst is reduced at a temperature of 650-900° C., including any point value in the temperature range. For example, the modified calcium silicate based nickel catalyst is reduced at a temperature of 650° C., 700° C., 750° C., 800° C., 850° C., or 900° C. In the step of introducing a feed gas into the reduced modified calcium silicate based nickel catalyst, the volume space velocity is 10,000-60,000 mL/g/h, including any point value in the value range. For example, the volume space velocity is 10,000 mL/g/h, 20,000 mL/g/h, 30,000 mL/g/h, 40,000 mL/g/h, 50,000 mL/g/h, or 60,000 mL/g/h. The reaction temperature is 650-900° C., including any point value in the temperature range. For example, the reaction temperature is 650° C., 700° C., 750° C., 800° C., 850° C., or 900° C. The volume fraction of $CH_4$ in the feed gas is 20-40 vol %, including any point value in the value range. For example, the volume fraction of $CH_4$ is 20 vol %, 25 vol %, 30 vol %, 35 vol %, or 40 vol %. The volume fraction of $CO_2$ in the feed gas is 20-40 vol %, including any point value in the value range. For example, the volume fraction of $CO_2$ is 20 vol %, 25 vol %, 30 vol %, 35 vol %, or 40 vol %. The volume fraction of the inert gas in the feed gas is 20-60 vol %, including any point value in the value range. For example, the volume fraction of the inert gas is 20 vol %, 30 vol %, 40 vol %, 50 vol %, or 60 vol %.

In the biogas reforming reaction, when the reaction temperature is equal to or greater than 750° C., the conversion rate of methane is equal to or greater than 80%, the conversion rate of carbon dioxide is equal to or greater than 87%, and the $H_2/CO$ selectivity coefficient is equal to or greater than 0.8.

Optionally, the biogas reforming reaction is a biogas dry reforming reaction, a biogas steam reforming reaction, a methane partial oxidation reforming reaction, or a methane autothermal reforming reaction.

In the field, a catalyst used for a biogas reforming reaction usually includes a carbon based material with large pore size (such as activated carbon or carbon nitride) or silica as a support, and nickel is loaded to the surface of the support by an impregnation method. In the biogas reforming reaction, the methane and carbon dioxide are promoted to undergo a reaction so as to be converted into syngas mainly based on the catalytic activity of nickel. However, the modified calcium silicate based nickel catalyst in an embodiment of the present application is different from conventional catalysts. The modified calcium silicate support in an embodiment of the present application not only has the effect of loading the active metal nickel, but also has the effect of assisting adsorption of carbon dioxide. In an embodiment of the present application, based on alkaline properties of the modified calcium silicate support, acidic carbon dioxide is more easily absorbed in the process of the biogas reforming reaction, and thus carbon dioxide is more easily and firmly adsorbed on the modified calcium silicate support, so that nickel uniformly dispersed on the surface of the modified calcium silicate support has a more effective catalytic effect on the reaction of the carbon dioxide and methane, and the catalytic reaction efficiency is improved.

The technical solutions of the present application are further explained and illustrated in combination with more specific embodiments and experimental test results.

Example 1

This example provides a modified calcium silicate based nickel catalyst. A preparation method of the modified calcium silicate based nickel catalyst includes the following steps:

leaching: leaching fly ash with a sodium hydroxide aqueous solution, subjecting the two substances to mixing and heating for a hydrothermal reaction at 110° C. for 0.5 h, and then conducting filtration and separation to obtain a sodium silicate leaching solution; and diluting the sodium silicate leaching solution to 0.3 mol/L for later use;

preparation of a support: adding 65 mL of the sodium silicate leaching solution with a concentration of 0.3 mol/L and a cerium nitrate solution dropwise to 100 mL of a calcium hydroxide suspension with a concentration of 0.2 mol/L, carrying out a first precipitation reaction at a reaction temperature of 25° C. and a stirring rate of 500 rpm for 2 h, and subjecting a precipitate produced by the reaction to filtration, washing with deionized water for three times, washing with ethanol for three times, drying at 80° C. for 12 h and calcination at 700° C. for 2 h to obtain a cerium modified calcium silicate support, where the doping amount of cerium in the modified calcium silicate support was 5 wt %, the dropping rate of the sodium silicate leaching solution was 25 mL/h, and the dropping rate of the cerium nitrate solution was 13 mL/h; and loading: adding 1 g of the modified calcium silicate support to 50 mL of anhydrous ethanol for ultrasonic dispersion for 10 min to obtain a mixed suspension, adding an ethanol solution of nickel nitrate dropwise to the mixed suspension at a dropping rate of 100 mL/h for a second precipitation reaction, conducting heating and stirring at a temperature of 65° C. and a stirring rate of 500 rpm until ethanol was completely volatilized, and then subjecting a resulting product to drying at 80° C. for 2 h and calcination at 500° C. for 4 h to obtain the modified calcium silicate based nickel catalyst, where the loading amount of nickel in the modified calcium silicate based nickel catalyst was 10 wt %.

Example 2

This example provides a modified calcium silicate based nickel catalyst. A preparation method of the modified calcium silicate based nickel catalyst includes the following steps:

leaching: leaching rice husk ash with a sodium hydroxide aqueous solution, subjecting the two substances to mixing and heating for a hydrothermal reaction at 110° C. for 0.5 h, and then conducting filtration and separation to obtain a sodium silicate leaching solution; and diluting the sodium silicate leaching solution to 0.3 mol/L for later use;

preparation of a support: adding 65 mL of the sodium silicate leaching solution with a concentration of 0.3 mol/L and a lanthanum nitrate solution dropwise to 100 mL of a calcium hydroxide suspension with a concentration of 0.2 mol/L, carrying out a first precipitation reaction at a reaction temperature of 40° C. and a stirring rate of 500 rpm for 4 h, and subjecting a precipitate produced by the reaction to filtration, washing with deionized water for three times, washing with ethanol for three times, drying at 80° C. for 12 h and calcination at 500° C. for 2 h to obtain a lanthanum modified calcium silicate support, where the doping amount of lanthanum in the modified calcium silicate support was 10 wt %, the dropping rate of the sodium silicate leaching solution was 20 mL/h, and the dropping rate of the lanthanum nitrate solution was 10 mL/h; and loading: adding 1 g of the modified calcium silicate support to 50 mL of anhydrous ethanol for ultrasonic dispersion for 10 min to obtain a mixed suspension, adding an ethanol solution of nickel nitrate dropwise to the mixed suspension at a dropping rate of 50 mL/h for a second precipitation reaction, conducting heating and stirring at a temperature of 65° C. and a stirring rate of 500 rpm until ethanol was completely volatilized, and then subjecting a resulting product to drying at 80° C. for 2 h and calcination at 400° C. for 4 h to obtain the modified calcium silicate based nickel catalyst, where the loading amount of nickel in the modified calcium silicate based nickel catalyst was 0.5 wt %.

Example 3

This example provides a modified calcium silicate based nickel catalyst. A preparation method of the modified calcium silicate based nickel catalyst includes the following steps:

leaching: leaching metallurgical slag with a sodium hydroxide aqueous solution, subjecting the two substances to mixing and heating for a hydrothermal reaction at 110° C. for 0.5 h, and then conducting filtration and separation to obtain a sodium silicate leaching solution; and diluting the sodium silicate leaching solution to 0.3 mol/L for later use;

preparation of a support: adding 65 mL of the sodium silicate leaching solution with a concentration of 0.3 mol/L and a samarium nitrate solution dropwise to 100 mL of a calcium hydroxide suspension with a concentration of 0.2 mol/L, carrying out a first precipitation reaction at a reaction temperature of 50° C. and a stirring rate of 500 rpm for 6 h, and subjecting a precipitate produced by the reaction to filtration, washing with deionized water for three times, washing with ethanol for three times, drying at 80° C. for 12 h and calcination at 600° C. for 2 h to obtain a samarium modified calcium silicate support, where the doping amount of samarium in the modified calcium silicate support was 2 wt %, the dropping rate of the sodium silicate leaching solution was 30 mL/h, and the dropping rate of the samarium nitrate solution was 15 mL/h; and loading: adding 1 g of the modified calcium silicate support to 50 mL of anhydrous ethanol for ultrasonic dispersion for 10 min to obtain a mixed suspension, adding an ethanol solution of nickel nitrate dropwise to the mixed suspension at a dropping rate of 60 mL/h for a second precipitation reaction, conducting heating and stirring at a temperature of 65° C. and a stirring rate of 500 rpm until ethanol was completely volatilized, and then subjecting a resulting product to drying at 80° C. for 2 h and calcination at 450° C. for 4 h to obtain the modified calcium silicate based nickel catalyst, where the loading amount of nickel in the modified calcium silicate based nickel catalyst was 10 wt %.

Example 4

This example provides a modified calcium silicate based nickel catalyst. A preparation method of the modified calcium silicate based nickel catalyst includes the following steps:

leaching: leaching fly ash with a sodium hydroxide aqueous solution, subjecting the two substances to mixing and heating for a hydrothermal reaction at 110° C. for 0.5 h, and then conducting filtration and separation to obtain a sodium silicate leaching solution; and diluting the sodium silicate leaching solution to 0.3 mol/L for later use;

preparation of a support: adding 65 mL of the sodium silicate leaching solution with a concentration of 0.3 mol/L and a praseodymium nitrate solution dropwise to 100 mL of a calcium hydroxide suspension with a concentration of 0.2 mol/L, carrying out a first precipitation reaction at a reaction temperature of 60° C. and a stirring rate of 500 rpm for 8 h, and subjecting a precipitate produced by the reaction to filtration, washing with deionized water for three times, washing with ethanol for three times, drying at 80° C. for 12 h and calcination at 800° C. for 2 h to obtain a praseodymium modified calcium silicate support, where the doping amount of praseodymium in the modified calcium silicate support was 1 wt %, the dropping rate of the sodium silicate leaching solution was 30 mL/h, and the dropping rate of the praseodymium nitrate solution was 15 mL/h; and loading: adding 1 g of the modified calcium silicate support to 50 mL of anhydrous ethanol for ultrasonic dispersion for 10 min to obtain a mixed suspension, adding an ethanol solution of nickel nitrate dropwise to the mixed suspension at a dropping rate of 70 mL/h for a second precipitation reaction, conducting heating and stirring at a temperature of 65° C. and a stirring rate of 500 rpm until ethanol was completely volatilized, and then subjecting a resulting product to drying at 80° C. for 2 h and calcination at 500° C. for 4 h to obtain the modified calcium silicate based nickel catalyst, where the loading amount of nickel in the modified calcium silicate based nickel catalyst was 5 wt %.

Example 5

This example provides a modified calcium silicate based nickel catalyst. A preparation method of the modified calcium silicate based nickel catalyst includes the following steps:

leaching: leaching fly ash with a sodium hydroxide aqueous solution, subjecting the two substances to mixing and heating for a hydrothermal reaction at 110° C. for 0.5 h, and then conducting filtration and separation to obtain a sodium silicate leaching solution; and diluting the sodium silicate leaching solution to 0.3 mol/L for later use;

preparation of a support: adding 65 mL of the sodium silicate leaching solution with a concentration of 0.3 mol/L and a cerium nitrate solution dropwise to 100 mL of a calcium hydroxide suspension with a concentration of 0.2 mol/L, carrying out a first precipitation reaction at a reaction temperature of 60° C. and a stirring rate of 500 rpm for 8 h, and subjecting a precipitate produced by the reaction to filtration, washing with deionized water for three times, washing with ethanol for three times, drying at 80° C. for 12 h and calcination at 800° C. for 2 h to obtain a cerium modified calcium silicate support, where the doping amount of cerium in the modified calcium silicate support was 2 wt %, the dropping rate of the sodium silicate leaching solution was 30 mL/h, and the dropping rate of the cerium nitrate solution was 15 mL/h; and loading: adding 1 g of the modified calcium silicate support to 50 mL of anhydrous ethanol for ultrasonic dispersion for 10 min to obtain a mixed suspension, adding an ethanol solution of nickel nitrate dropwise to the mixed suspension at a dropping rate of 90 mL/h for a second precipitation reaction, conducting heating and stirring at a temperature of 65° C. and a stirring rate of 500 rpm until ethanol was completely volatilized, and then subjecting a resulting product to drying at 80° C. for 2 h and calcination at 500° C. for 4 h to obtain the modified calcium silicate based nickel catalyst, where the loading amount of nickel in the modified calcium silicate based nickel catalyst was 2 wt %.

Example 6

This example provides a modified calcium silicate based nickel catalyst. A preparation method of the modified calcium silicate based nickel catalyst includes the following steps:

leaching: leaching fly ash with a sodium hydroxide aqueous solution, subjecting the two substances to mixing and heating for a hydrothermal reaction at 110° C. for 0.5 h, and then conducting filtration and separation to obtain a sodium silicate leaching solution; and diluting the sodium silicate leaching solution to 0.3 mol/L for later use;

preparation of a support: adding 65 mL of the sodium silicate leaching solution with a concentration of 0.3 mol/L and a lanthanum nitrate solution dropwise to 100 mL of a calcium hydroxide suspension with a concentration of 0.2 mol/L, carrying out a first precipitation reaction at a reaction temperature of 60° C. and a stirring rate of 500 rpm for 8 h, and subjecting a precipitate produced by the reaction to filtration, washing with deionized water for three times, washing with ethanol for three times, drying at 80° C. for 12 h and calcination at 800° C. for 2 h to obtain a lanthanum modified calcium silicate support, where the doping amount of lanthanum in the modified calcium silicate support was 5 wt %, the dropping rate of the sodium silicate leaching solution was 25 mL/h, and the dropping rate of the lanthanum nitrate solution was 13 mL/h; and loading: adding 1 g of the modified calcium silicate support to 50 mL of anhydrous ethanol for ultrasonic dispersion for 10 min to obtain a mixed suspension, adding an ethanol solution of nickel nitrate dropwise to the mixed suspension at a dropping rate of 80 mL/h for a second precipitation reaction, conducting heating and stirring at a temperature of 65° C. and a stirring rate of 500 rpm until ethanol was completely volatilized, and then subjecting a resulting product to drying at 80° C. for 2 h and calcination at 500° C. for 4 h to obtain the modified calcium silicate based nickel catalyst, where the loading amount of nickel in the modified calcium silicate based nickel catalyst was 5 wt %.

Application Example

The application example provides application of a modified calcium silicate based nickel catalyst in a biogas reforming reaction. The biogas reforming reaction includes the following steps:

introducing a reducing gas into the modified calcium silicate based nickel catalyst in Example 1 to reduce the modified calcium silicate based nickel catalyst in Example 1 at 750° C., where the reducing gas contains 10 vol % of hydrogen and the remaining part of an inert gas such as nitrogen; and introducing a feed gas into the reduced modified calcium silicate based nickel catalyst for a reaction at a volume space velocity of 60,000 mL/g/h at 650-900° C., where catalytic properties of the modified calcium silicate based nickel catalyst in an embodiment of the present application can be obtained based on results of the reaction activity tested at different reaction temperatures and reaction times (including the conversion rate of methane, the conversion rate of carbon dioxide and the $H_2$/CO selectivity coefficient), and the feed gas consists of 20 vol % of $CH_4$, 20 vol % of $CO_2$ and 60 vol % of nitrogen.

Performance Test

Analysis of morphology: The surface morphology of the modified calcium silicate based nickel catalyst in Example 1 was characterized by using a field emission scanning electron microscope (SEM), and results are as shown in FIG. 2. FIG. 2 is a scanning electron microscopy image of a modified calcium silicate based nickel catalyst in Example 1. From FIG. 2, it can be seen that the surface of the modified calcium silicate based nickel catalyst in an embodiment of the present application has a large number of folds formed and a large specific surface area.

Figure 5:
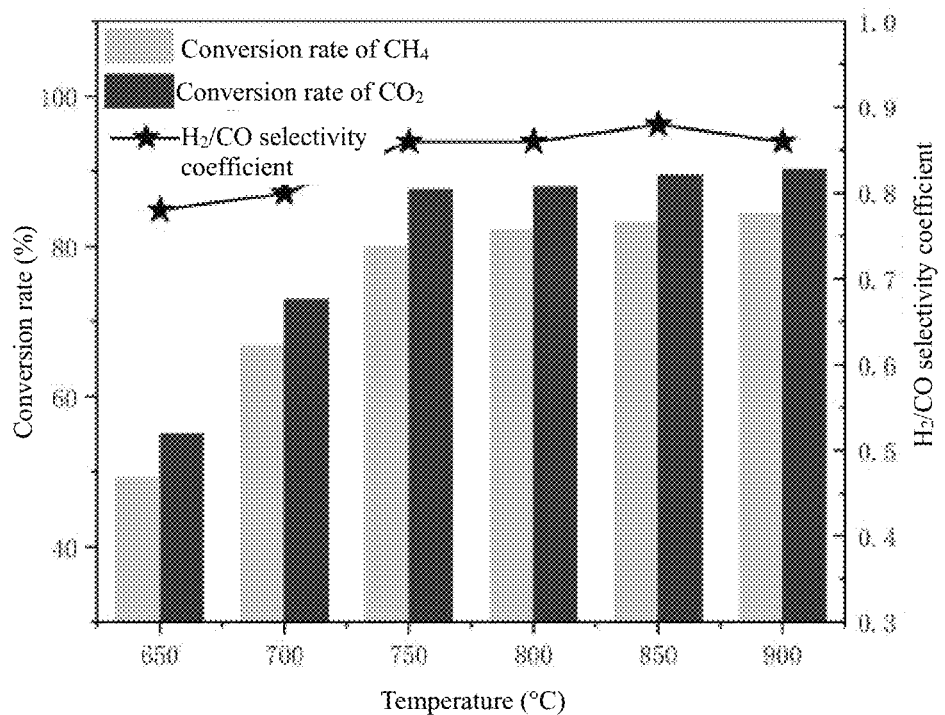
FIG. 5 is a diagram showing the catalytic conversion rate of a modified calcium silicate based nickel catalyst in Example 5 at different temperatures.
Figure 6:
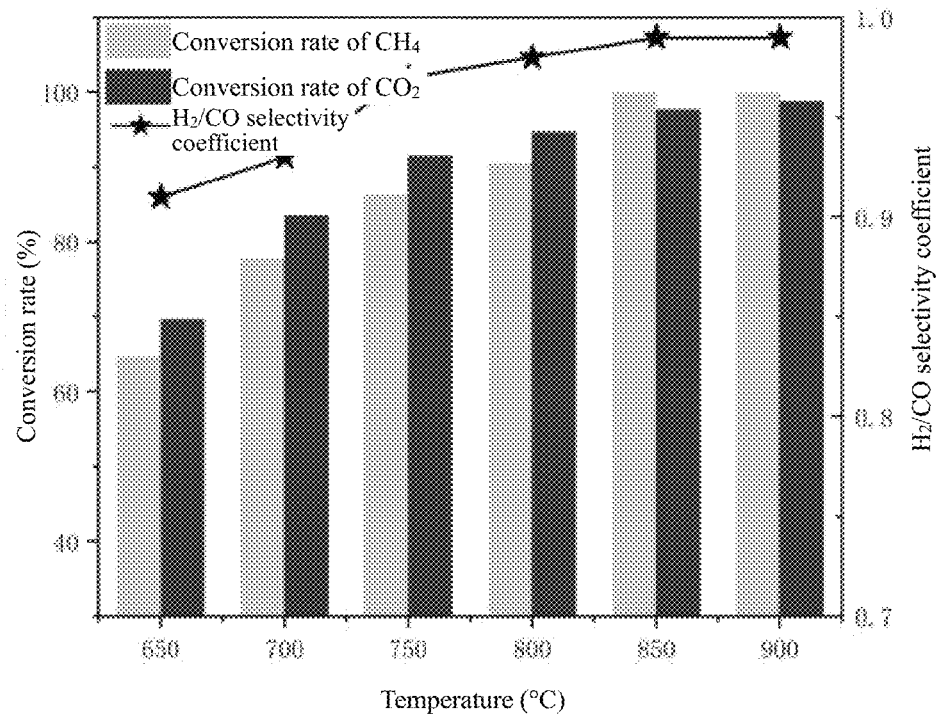
FIG. 6 is a diagram showing the catalytic conversion rate of a modified calcium silicate based nickel catalyst in Example 6 at different temperatures.

Analysis of catalytic conversion efficiency: In order to test the catalytic conversion efficiency of the modified calcium silicate based nickel catalyst applied in a biogas reforming reaction in an embodiment of the present application, the conversion rate of the modified calcium silicate based nickel catalysts in Example 1, Example 5 and Example 6 was tested at different reaction temperatures by gas chromatography, and results are as shown in FIG. 3, FIG. 5 and FIG. 6. FIG. 3 is a diagram showing the catalytic conversion rate of the modified calcium silicate based nickel catalyst in Example 1 at different temperatures. FIG. 5 is a diagram showing the catalytic conversion rate of the modified calcium silicate based nickel catalyst in Example 5 at different temperatures. FIG. 6 is a diagram showing the catalytic conversion rate of the modified calcium silicate based nickel catalyst in Example 6 at different temperatures. From FIG. 3, it can be seen that when the modified calcium silicate based nickel catalyst in Example 1 is used in a biogas reforming reaction, at 750° C., the conversion rate of carbon dioxide reaches 87%, the conversion rate of methane reaches 80%, and the $H_2$/CO selectivity coefficient reaches 0.8. With the increase of the reaction temperature, the conversion rate of carbon dioxide, the conversion rate of methane, the $H_2$/CO selectivity coefficient and other indexes are also increasing. From FIG. 5, it can be seen that when the modified calcium silicate based nickel catalyst in Example 5 is used in a biogas reforming reaction, at 750° C., the conversion rate of carbon dioxide reaches 88%, the conversion rate of methane reaches 80%, and the $H_2$/CO selectivity coefficient reaches 0.86. With the increase of the reaction temperature, the conversion rate of carbon dioxide, the conversion rate of methane, the $H_2$/CO selectivity coefficient and other indexes are also increasing. From FIG. 6, it can be seen that when the modified calcium silicate based nickel catalyst in Example 6 is used in a biogas reforming reaction, at 750° C., the conversion rate of carbon dioxide reaches 91%, the conversion rate of methane reaches 86%, and the $H_2$/CO selectivity coefficient reaches 0.97. With the increase of the reaction temperature, the conversion rate of carbon dioxide, the conversion rate of methane, the $H_2$/CO selectivity coefficient and other indexes are also increasing. The above experimental results show that the modified calcium silicate based nickel catalyst has high catalytic conversion efficiency at low preparation cost, is suitable for a biogas reforming reaction, and has an industrial application prospect.

Figure 4:
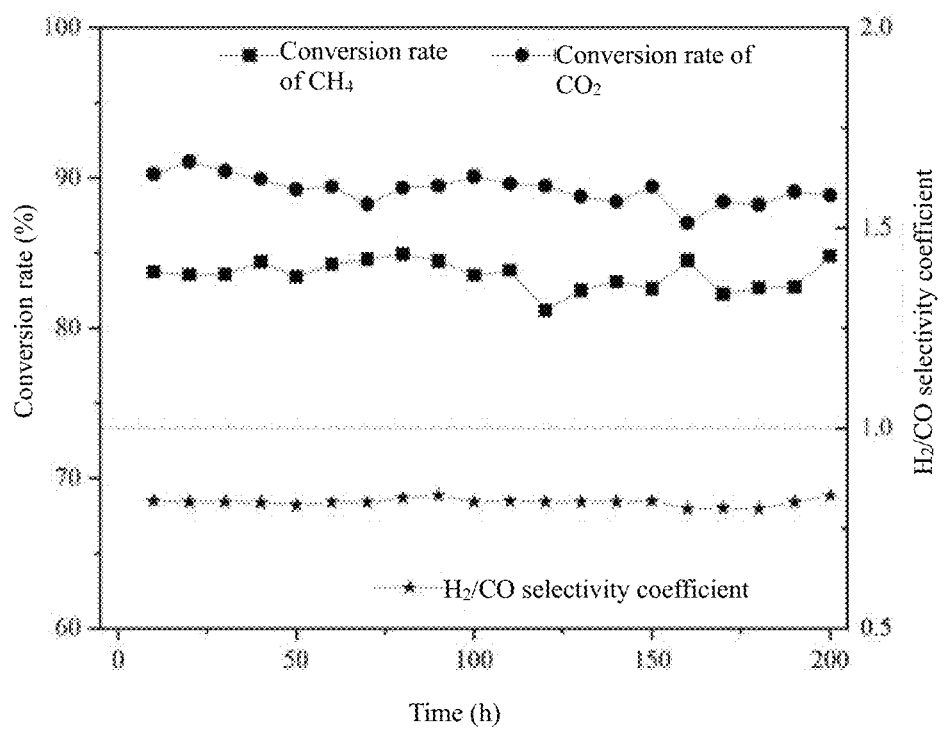
FIG. 4 is a diagram showing test results of the stability of the modified calcium silicate based nickel catalyst in Example 1.
Figure 7:
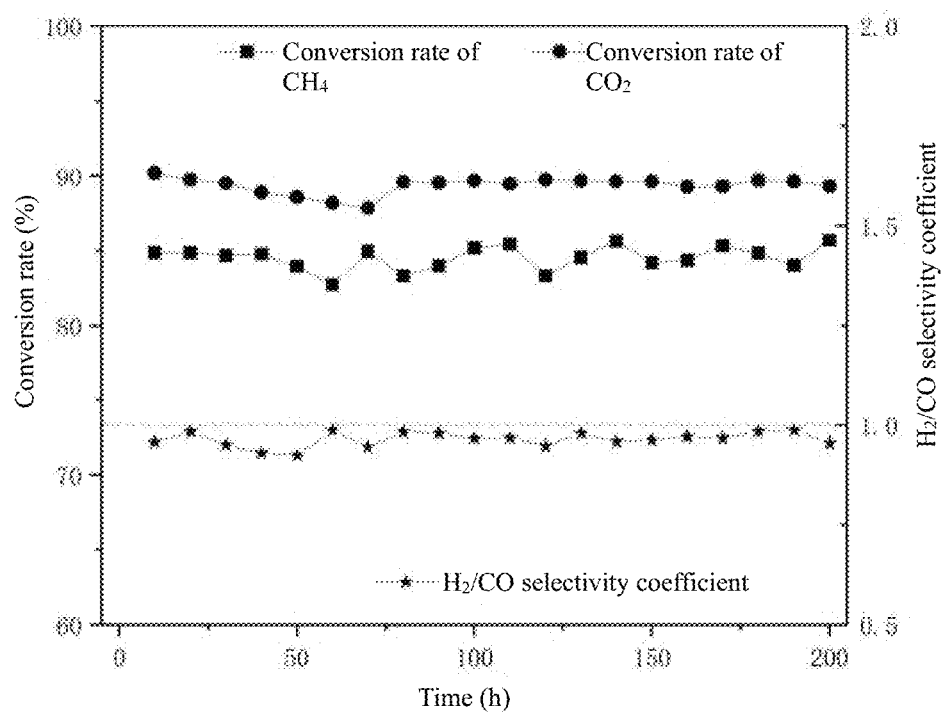
FIG. 7 is a diagram showing test results of the stability of the modified calcium silicate based nickel catalyst in Example 6.

Analysis of catalytic stability: In order to test the catalytic stability of the modified calcium silicate based nickel catalyst applied in a biogas reforming reaction in an embodiment of the present application, the stability of the modified calcium silicate based nickel catalysts in Example 1 and Example 6 was tested at 750° C. by gas chromatography, and results are as shown in FIG. 4 and FIG. 7. FIG. 4 is a diagram showing test results of the stability of the modified calcium silicate based nickel catalyst in Example 1. FIG. 7 is a diagram showing test results of the stability of the modified calcium silicate based nickel catalyst in Example 6. From FIG. 4, it can be seen that when the reaction is conducted for 200 h, the conversion rate, the $H_2$/CO selectivity coefficient and other indexes of the modified calcium silicate based nickel catalyst in Example 1 are not decreased significantly, which are basically the same as the initial values of the indexes. Similarly, from FIG. 7, it can be seen that when the reaction is conducted for 200 h, the conversion rate, the $H_2$/CO selectivity coefficient and other indexes of the modified calcium silicate based nickel catalyst in Example 6 are not decreased significantly, which are basically the same as the initial values of the indexes. The conversion rate of carbon dioxide is maintained at 89%-91%, the conversion rate of methane is maintained at 84%-86%, and the $H_2/CO$ selectivity coefficient is maintained at 0.96-0.98. It can be seen that the modified calcium silicate based nickel catalyst in an embodiment of the present application has high catalytic stability under high temperature conditions.

Through the above test results, it can be seen that the modified calcium silicate based nickel catalyst in an embodiment of the present application includes a silicate leaching solution extracted from a silicon based solid waste as a raw material, and a modified calcium silicate support prepared is used as a support of the catalyst. While the production cost is effectively reduced, excellent catalytic conversion efficiency and catalytic stability can still be achieved, and a new preparation idea and a modified calcium silicate based nickel catalyst with excellent catalytic properties are provided for achieving resource utilization of a silicon based solid waste and high-value resource reuse of biogas at the same time.

A modified calcium silicate based nickel catalyst and a preparation method and application thereof are introduced in detail in embodiments of the present application as above. The principle and embodiments of the application are illustrated in specific examples herein, and the above embodiments are described only to help understand the technical solutions and core ideas of the present application. Meanwhile, various changes in specific embodiments and application scope will be made by persons of ordinary skill in the field according to the ideas of the present application. In summary, contents in the specification should not be understood as limitations of the present application.

What is claimed is:

1. A preparation method of a modified calcium silicate based nickel catalyst, wherein the preparation method comprises the following steps:
   leaching: leaching a silicon based solid waste with an alkali agent to obtain a silicate leaching solution;
   preparation of a support: adding the silicate leaching solution and a nitrate solution corresponding to a lanthanum metal dropwise to a calcium hydroxide suspension for a first precipitation reaction, and subjecting a precipitate produced by the reaction to filtration, drying and calcination to obtain a modified calcium silicate support; and
   loading: dispersing the modified calcium silicate support in an anhydrous alcohol solvent to obtain a mixed suspension, adding an alcohol solution of a nickel salt dropwise to the mixed suspension for a second precipitation reaction, conducting heating and stirring until alcohols in the anhydrous alcohol solvent and the alcohol solution of a nickel salt are volatilized, and then conducting drying and calcination to obtain the modified calcium silicate based nickel catalyst.

2. The preparation method according to claim 1, wherein the silicon based solid waste comprises at least one of rice husk ash, fly ash, metallurgical slag or blast furnace iron slag; the alkali agent comprises at least one of sodium hydroxide, potassium hydroxide, sodium carbonate or potassium carbonate;
   and in the step of loading, the anhydrous alcohol solvent is anhydrous ethanol, anhydrous methanol or anhydrous propanol, and alcohol used in the alcohol solution of a nickel salt is the same that in the anhydrous alcohol solvent.

3. The preparation method according to claim 2, wherein in the step of loading, the modified calcium silicate support is added to anhydrous ethanol for ultrasonic dispersion for 10-15 min to obtain the mixed suspension, wherein the solid-liquid ratio of the modified calcium silicate support to the anhydrous ethanol is 1 g:30 mL to 1 g:60 mL, and the loading amount of nickel in the modified calcium silicate based nickel catalyst is 0.5-10 wt %.

4. The preparation method according to claim 2, wherein in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

5. The preparation method according to claim 1, wherein the nitrate solution corresponding to a lanthanum metal comprises at least one of cerium nitrate, lanthanum nitrate, samarium nitrate or praseodymium nitrate;
   in the step of preparation of a support, the molar ratio of a silicate ion in the silicate leaching solution to calcium hydroxide in the calcium hydroxide suspension is 0.9:1 to 1.1:1;
   and the doping amount of the lanthanum metal in the modified calcium silicate support is 1-10 wt %.

6. The preparation method according to claim 5, wherein in the step of loading, the modified calcium silicate support is added to anhydrous ethanol for ultrasonic dispersion for 10-15 min to obtain the mixed suspension, wherein the solid-liquid ratio of the modified calcium silicate support to the anhydrous ethanol is 1 g:30 mL to 1 g:60 mL, and the loading amount of nickel in the modified calcium silicate based nickel catalyst is 0.5-10 wt %.

7. The preparation method according to claim 5, wherein in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

8. The preparation method according to claim 1, wherein in the step of preparation of a support, the silicate leaching solution is added dropwise at a rate of 20-30 mL/h, the nitrate solution corresponding to a lanthanum metal is added dropwise at a rate of 10-15 mL/h, and the first precipitation reaction is carried out at a temperature of 25-60° C. and a stirring rate of 450-550 rpm for 2-8 h.

9. The preparation method according to claim 8, wherein in the step of loading, the modified calcium silicate support is added to anhydrous ethanol for ultrasonic dispersion for 10-15 min to obtain the mixed suspension, wherein the solid-liquid ratio of the modified calcium silicate support to the anhydrous ethanol is 1 g:30 mL to 1 g:60 mL, and the loading amount of nickel in the modified calcium silicate based nickel catalyst is 0.5-10 wt %.

10. The preparation method according to claim 8, wherein in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

11. The preparation method according to claim 1, wherein in the step of preparation of a support, the precipitate produced by the reaction is sequentially washed with water for at least one time and washed with an alcohol solvent for at least one time after filtration and before drying, the drying is conducted at 75-85° C. for 10-14 h, and the calcination is conducted at 500-800° C. for 1.8-2.5 h.

12. The preparation method according to claim 11, wherein in the step of loading, the modified calcium silicate support is added to anhydrous ethanol for ultrasonic dispersion for 10-15 min to obtain the mixed suspension, wherein the solid-liquid ratio of the modified calcium silicate support to the anhydrous ethanol is 1 g:30 mL to 1 g:60 mL, and the loading amount of nickel in the modified calcium silicate based nickel catalyst is 0.5-10 wt %.

13. The preparation method according to claim 11, wherein in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

14. The preparation method according to claim 1, wherein in the step of loading, the modified calcium silicate support is added to anhydrous ethanol for ultrasonic dispersion for 10-15 min to obtain the mixed suspension, wherein the solid-liquid ratio of the modified calcium silicate support to the anhydrous ethanol is 1 g:30 mL to 1 g:60 mL, and the loading amount of nickel in the modified calcium silicate based nickel catalyst is 0.5-10 wt %.

15. The preparation method according to claim 1, wherein in the step of loading, the alcohol solution of a nickel salt is an ethanol solution of a nickel salt, the ethanol solution of a nickel salt is added dropwise at a rate of 50-100 mL/h, and the second precipitation reaction is carried out at a temperature of 65-68° C. and a stirring rate of 450-550 rpm until alcohols in the anhydrous alcohol solvent and the ethanol solution of a nickel salt are completely volatilized.

16. The preparation method according to claim 1, wherein in step of loading, the drying is conducted at 75-85° C. for 1.5-3 h, and the calcination is conducted at 400-500° C. for 4-5 h.

17. A modified calcium silicate based nickel catalyst, wherein the modified calcium silicate based nickel catalyst is prepared by the preparation method according to claim 1.

18. Application of a modified calcium silicate based nickel catalyst, wherein the modified calcium silicate based nickel catalyst is prepared by the preparation method according to claim 1, and used for a biogas reforming reaction.

19. The application according to claim 18, wherein the biogas reforming reaction comprises the following steps:
introducing a reducing gas into the modified calcium silicate based nickel catalyst to reduce the modified calcium silicate based nickel catalyst at 650-900° C., wherein the reducing gas contains 10-20 vol % of hydrogen; and
introducing a feed gas into the reduced modified calcium silicate based nickel catalyst for a reaction at a volume space velocity of 10,000-60,000 mL/g/h at 650-900° C., wherein the feed gas consists of 20-40 vol % of $CH_4$, 20-40 vol % of $CO_2$ and 20-60 vol % of an inert gas, and the inert gas is at least one of nitrogen, helium, neon or argon.

20. The application according to claim 18, wherein in the biogas reforming reaction, when the reaction temperature is equal to or greater than 750° C., the conversion rate of methane is equal to or greater than 80%, the conversion rate of carbon dioxide is equal to or greater than 87%, and the $H_2$/CO selectivity coefficient is equal to or greater than 0.8.

* * * * *